United States Patent
Lewis et al.

(10) Patent No.: US 9,436,758 B1
(45) Date of Patent: Sep. 6, 2016

(54) METHODS AND SYSTEMS FOR PARTITIONING DOCUMENTS HAVING CUSTOMER FEEDBACK AND SUPPORT CONTENT

(75) Inventors: Glenn M. Lewis, Costa Mesa, CA (US); Kirill Buryak, Sunnyvale, CA (US); Nadav Benbarak, Boston, MA (US); Aner Ben-Artzi, Los Angeles, CA (US); Jun Peng, San Ramon, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/530,619

(22) Filed: Jun. 22, 2012

Related U.S. Application Data

(60) Provisional application No. 61/580,503, filed on Dec. 27, 2011, provisional application No. 61/594,748, filed on Feb. 3, 2012.

(51) Int. Cl.
*G06F 17/30* (2006.01)

(52) U.S. Cl.
CPC .............................. *G06F 17/30654* (2013.01)

(58) Field of Classification Search
CPC ................................................ G06F 17/30654
USPC .......................................................... 707/737
See application file for complete search history.

(56) References Cited

U.S. PATENT DOCUMENTS

| | | |
|---|---|---|
| 6,028,601 A * | 2/2000 | Machiraju ......... G06F 17/30675 707/999.004 |
| 6,167,397 A | 12/2000 | Jacobson et al. |
| 6,363,379 B1 | 3/2002 | Jacobson et al. |
| 6,424,971 B1 * | 7/2002 | Kreulen et al. ................ 707/737 |
| 6,469,073 B1 | 10/2002 | Manke et al. |
| 6,751,614 B1 | 6/2004 | Rao |
| 6,753,360 B2 | 6/2004 | Mielewski et al. |
| 6,766,316 B2 | 7/2004 | Caudill et al. |
| 6,829,734 B1 * | 12/2004 | Kreulen et al. ................. 714/46 |
| 7,157,517 B2 | 1/2007 | Gulari et al. |
| 7,158,986 B1 | 1/2007 | Oliver et al. |
| 7,387,749 B2 | 6/2008 | Gulari et al. |
| 7,496,567 B1 | 2/2009 | Steichen |
| 7,584,100 B2 | 9/2009 | Zhang et al. |
| 7,593,904 B1 | 9/2009 | Kirshenbaum et al. |
| 7,698,129 B2 | 4/2010 | Adachi et al. |
| 7,937,345 B2 | 5/2011 | Schmidtler et al. |

(Continued)

OTHER PUBLICATIONS

Article entitled "A Help Desk Support System with Filtering and Reusing E-mails", by Iwai et al., Copyright 2010.*

(Continued)

*Primary Examiner* — Mahesh Dwivedi
(74) *Attorney, Agent, or Firm* — Fish & Richardson P.C.

(57) ABSTRACT

Methods and systems for use in partitioning documents having customer feedback and support content are provided. One exemplary computer-implemented method including executing instructions stored on a computer-readable medium includes receiving a plurality of documents, at least a portion of the plurality of documents including customer feedback related to an issue and support content responsive to the customer feedback, filtering the plurality of documents to retain one of the customer feedback and the support content within a plurality of filtered documents, partitioning the plurality of filtered documents into multiple clusters, receiving a new document, and partitioning the new document based on at least one keyword included in one of the multiple clusters of filtered documents.

18 Claims, 3 Drawing Sheets

(56) References Cited

U.S. PATENT DOCUMENTS

| | | |
|---|---|---|
| 7,958,067 B2 | 6/2011 | Schmidtler et al. |
| 8,090,717 B1 | 1/2012 | Bharat et al. |
| 8,543,577 B1* | 9/2013 | Ben-Artzi et al. ............ 707/738 |
| 8,682,647 B1* | 3/2014 | Lee .................... G06F 17/2775 704/1 |
| 2001/0034015 A1* | 10/2001 | Raichur .................. G09B 7/02 434/322 |
| 2002/0065845 A1* | 5/2002 | Naito et al. ................ 707/500.1 |
| 2003/0018629 A1* | 1/2003 | Namba ............................. 707/3 |
| 2003/0050908 A1* | 3/2003 | Kreulen et al. ................... 707/1 |
| 2003/0093276 A1* | 5/2003 | Miller .................... G10L 15/22 704/257 |
| 2003/0130993 A1 | 7/2003 | Mendelevitch et al. |
| 2004/0111408 A1 | 6/2004 | Caudill et al. |
| 2005/0262428 A1 | 11/2005 | Little et al. |
| 2006/0095521 A1 | 5/2006 | Patinkin |
| 2006/0155575 A1 | 7/2006 | Gross |
| 2007/0027830 A1 | 2/2007 | Simons et al. |
| 2009/0006549 A1* | 1/2009 | Singh et al. .................... 709/204 |
| 2009/0177981 A1* | 7/2009 | Christie ............. G06F 3/04883 715/758 |
| 2010/0017487 A1 | 1/2010 | Patinkin |
| 2010/0122212 A1 | 5/2010 | Boudalier |
| 2010/0223276 A1 | 9/2010 | Al-Shameri et al. |
| 2011/0145178 A1 | 6/2011 | Schmidtler et al. |
| 2011/0214080 A1* | 9/2011 | Agrawal et al. .............. 715/771 |
| 2011/0238410 A1 | 9/2011 | Larcheveque et al. |
| 2011/0258192 A1* | 10/2011 | Yao ................... G06F 17/30867 707/737 |
| 2011/0289076 A1* | 11/2011 | Boyle et al. .................. 707/723 |
| 2011/0307485 A1 | 12/2011 | Udupa et al. |
| 2012/0016871 A1 | 1/2012 | Acharya et al. |
| 2012/0078891 A1* | 3/2012 | Brown .............. G06F 17/30654 707/723 |
| 2012/0078969 A1 | 3/2012 | Ananthanarayanan et al. |
| 2012/0102037 A1* | 4/2012 | Ozonat ........................ 707/738 |
| 2013/0007037 A1* | 1/2013 | Azzam et al. ................ 707/769 |
| 2013/0024457 A1* | 1/2013 | Chua ...................... G06F 17/30 707/740 |
| 2013/0046764 A1* | 2/2013 | Choi et al. .................... 707/740 |
| 2013/0117267 A1* | 5/2013 | Buryak et al. ................ 707/737 |
| 2013/0149688 A1* | 6/2013 | Bean ........................ G09B 7/02 434/362 |
| 2013/0198114 A1* | 8/2013 | Pinhanez ........................ 706/12 |

OTHER PUBLICATIONS

WO 02/025627, Published on Mar. 28, 2002, by Kowalski et al.*
Article entitled "Distributed Word Clustering for Large Scale Class-Based Language Modeling in Machine Translation", by Uszkoreit et al., dated Jun. 2008.*

* cited by examiner

METHODS AND SYSTEMS FOR PARTITIONING DOCUMENTS HAVING CUSTOMER FEEDBACK AND SUPPORT CONTENT

CROSS REFERENCE TO RELATED APPLICATIONS

This application claims priority to provisional patent application Ser. No. 61/580,503 filed on Dec. 27, 2011, and provisional patent application Ser. No. 61/594,748 filed on Feb. 3, 2012, which are both hereby incorporated by reference in their entirety

BACKGROUND OF THE INVENTION

This invention relates generally to systems and methods for use in processing documents, and more particularly, to partitioning documents having customer feedback and support content.

Automated classification, or "labeling," of data may be used to efficiently organize, route, and/or process large quantities of data. As an example, support centers receive large amounts of documents related to support requests. Document labeling techniques, such as clustering, may be used to group together similar documents.

Various algorithms can be used to partition documents by producing different clusters of documents such that the documents within a given cluster share a common characteristic. Documents can include different types of electronic files such as text files, e-mails, images, metadata files, audio files, and presentations. Each such type of document may include content provided from a user and content provided from support personnel. In various systems, manual inspection of the documents for labeling purposes can be very time consuming and expensive, especially when organizing large quantities of documents with several sections of user and support content. Accordingly, it is desirable to have a system and method for automatically processing documents containing multiple types of content included within a cluster of documents.

BRIEF DESCRIPTION OF THE INVENTION

In one aspect, a computer implemented method including executing instructions stored on a computer-readable medium is provided. The method includes receiving a plurality of documents, at least a portion of the plurality of documents including customer feedback related to an issue and support content responsive to the customer feedback, filtering the plurality of documents to retain one of the customer feedback and the support content within a plurality of filtered documents, partitioning the plurality of filtered documents into multiple clusters, receiving a new document, and partitioning the new document based on at least one keyword included in one of the multiple clusters of filtered documents.

In another aspect, a computer system for use in partitioning a plurality of documents is provided. The computer system includes a plurality of processing engines and a memory device accessible by the processing engines. The memory device is for storing a plurality of documents, at least a portion of the plurality of documents including customer feedback related to an issue and support content responsive to the customer feedback. The plurality of processing engines includes a filtering engine configured to retain one of the customer feedback and the support content within a plurality of filtered documents and a partitioning engine configured to partition the plurality of filtered documents including into multiple clusters. The partitioning engine is configured to partition a new document based on at least one keyword included in one of the multiple clusters of filtered documents.

In another embodiment, one or more computer-readable media having computer-executable instructions embodied thereon is provided. When executed by a processor, the computer-executable instructions cause the processor to retrieve a plurality of documents from a database, at least a portion of the plurality of documents including customer feedback related to an issue and support content responsive to the customer feedback, filter the plurality of documents to retain one of the customer feedback and the support content within a plurality of filtered documents, partition the plurality of filtered documents into multiple clusters, receive a new document, and partition the new document based on at least one keyword included in one of the multiple clusters of filtered documents.

The details of one or more implementations are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION OF THE INVENTION

Figure 1:
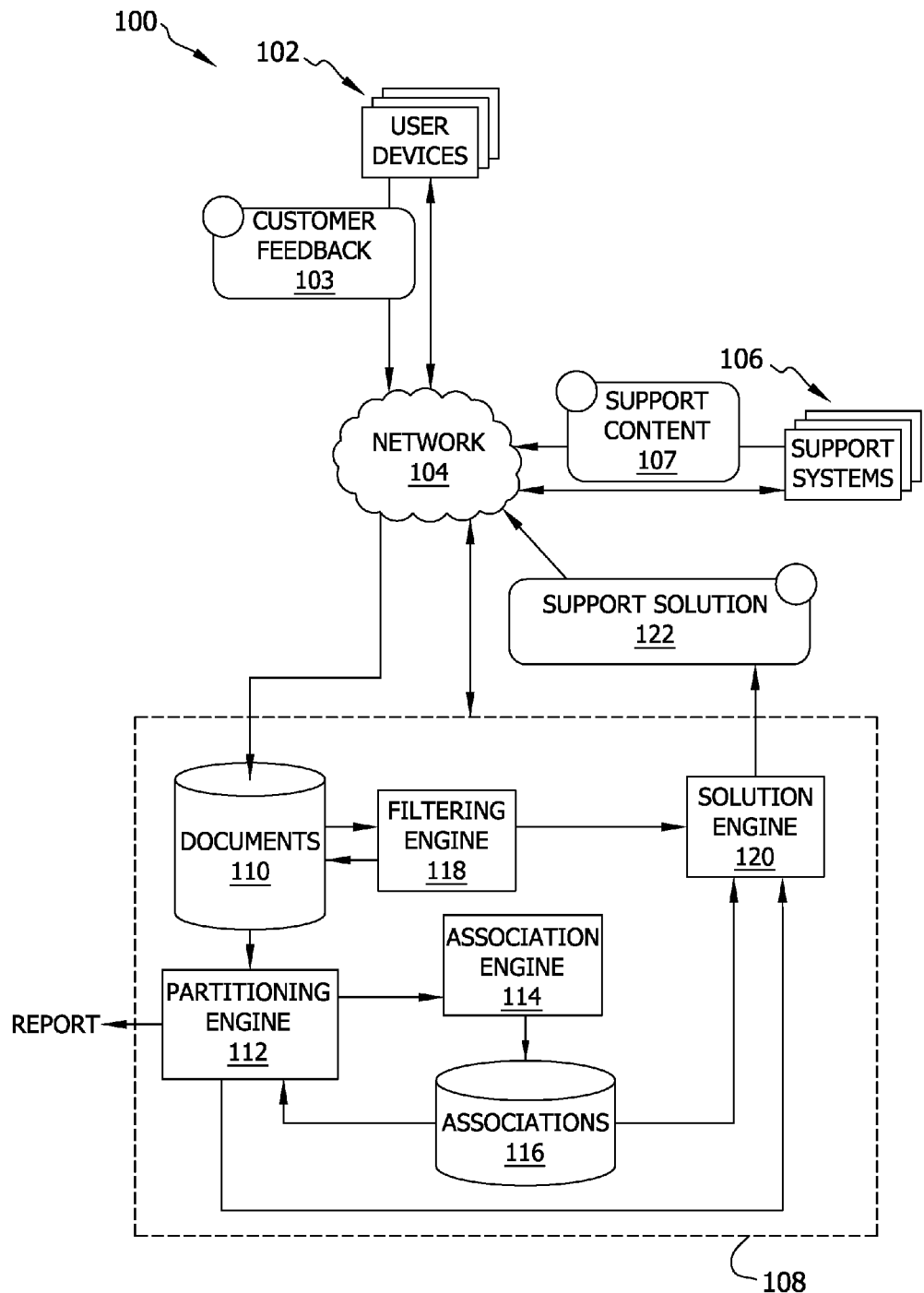
FIG. 1 is a diagram of an exemplary environment for providing partitioning documents from a corpus of documents including customer feedback.

This document describes systems, methods and techniques for automatically partitioning a plurality of documents including both customer feedback and support content. Online support centers, for example, may receive thousands or millions of documents containing customer feedback referring to an issue (e.g., problems, questions, comments, etc.) per month over a variety of different communication channels. Example communication channels include email thread, chat thread, help forums thread, messaging platforms thread, message boards, postings, dislike indications, or telephone calls. In such documents, the customer feedback is provided with support content provided by a customer support representative (CSR) in response to the customer feedback. The support content often includes official language referencing particular questions and/or or solutions for the issue. Conversely, customer feedback generally includes informal phrases/terms that are often different than official language. For example, a customer may indicate that "a credit card has been declined," while a support person may characterize the support request as "defaulted account."

In some implementations, one of the customer feedback and the support content can be filtered from such documents to provide efficient partitioning of filtered documents and/or identification of one or more support solutions for the issue raised in the customer feedback. For example, customer feedback may be filtered to provide filtered documents, having concise descriptions of the user's issue in official language. The concise descriptions may be used to identify an issue within the documents and/or suggest a support solution. Moreover, the filtered documents may further be partitioned to generate one or more reports regarding a topic indicated by clusters formed from such partitioning. Because one of the customer feedback and the support content is filtered from the documents, the partitioning of the documents can be more precise and consistent, and the reports and/or support solutions based thereon may also be more precise and consistent.

Additionally, or alternatively, some implementations can include automated systems and/or methods that learn from partitioning customer feedback and the support content together. By partitioning (e.g., clustering) documents in this manner, associations between terms/phrases included in customer feedback with terms/phrase included in support content may be identified. The associated terms/phrases may then be used, for example, to automatically partition further documents received into the plurality of documents.

Furthermore, associated terms/phrases may be used, for example, to automatically identify a solution for an issue included in a new document. In some implementations, a support solution may be automatically provided to eliminate or significantly reduce the need for human involvement in the solution, e.g., by requiring little or no action by customer support, help desk, or other support personnel to provide solutions. Moreover, some customer feedback may still be manually processed and answered, e.g., by CSRs. The systems and methods herein can be used to support the CSRs by automatically generating one or more proposed or recommended support solutions. The CSR can select one or more appropriate support solutions from those generated and provide the selected support solution to the user.

In at least some embodiments hereof, technical effects of the methods, systems, and computer-readable media described herein include at least one of: (a) receiving a plurality of documents, at least a portion of the plurality of documents including customer feedback related to an issue and support content responsive to the customer feedback, (b) filtering the plurality of documents to retain one of the customer feedback and the support content within a plurality of filtered documents, (c) partitioning the plurality of filtered documents into multiple clusters, (d) receiving a new document, and (e) partitioning the new document based on at least one keyword included in one of the multiple clusters of filtered documents. In at least some embodiments hereof, technical effects of the methods, systems, and computer-readable media described herein include at least one of: (a) receiving a plurality of documents, each of the plurality of documents including customer feedback related to an issue and support content responsive to the customer feedback, (b) partitioning the plurality of documents into multiple clusters, (c) associating a user keyword included in the customer feedback from one of the multiple clusters with a support keyword included in the support content from said one of the multiple clusters, (d) receiving a new document, and (e) partitioning the new document when the new document includes at least one of the user keyword and the support keyword.

FIG. 1 is a diagram of an example environment 100 for providing utilizing document including customer feedback 103 and support content 107. The environment 100 includes user devices 102 (e.g., from which customer feedback originates) that are communicatively connected, through a network 104, with support systems 106 and a customer-support module 108. The user devices 102, for example, can be used by users who access online resources, such as resources that are supported by the support systems 106. The user devices 102 can also host web browsers (e.g., by which users can access the resources) and other applications (e.g., email) for submitting customer feedback. The support systems 106 can include one or more online service/support entities, such as online advertising systems, online stores, auction houses, etc. The network 104 can include any combination of the Internet, local area networks (LANs), wide area networks (WANs), and other networks. Interactions that occur between the user devices 102 and the support systems 106, including support content, e.g., support solutions, used for particular customer feedback 103, can be used to generate documents that are stored in the customer-support module 108.

In some implementations, the customer-support module 108 includes a database, which is configured to store documents 110 containing customer feedback and support content. The database may be any type of memory 304 and/or storage device 306 described below with reference to FIG. 3. The customer feedback and support content included in the documents 110, for example, can be used by a partitioning engine 112 to partition (e.g., cluster, categorize, or classify) the documents 110 into groups. Various algorithms can be used by the partitioning engine 112. For example, the partitioning engine 112 can use a distributed exchange algorithm to cluster the set of relevant resources and discover the topics included in the set of relevant resources. In some implementations, the clustering algorithm is applied after an information retrieval/text mining algorithm, such as a term frequency-inverse document frequency algorithm, is applied to the set of relevant resources to identify features, such as the content of the resources (e.g., words, numbers and/or phrases included in the resources), contextual features of the resources (e.g., the URL of the resource) and meta-data associated with the resources (e.g., tags associated with the resource) in each resource that are relevant to the keyword and/or represent the majority of the topic information (i.e., topic features), which can be used for clustering. In some implementations, the partitioning engine 112 attempts to group the set of relevant resources in various groupings until an optimal or near optimal grouping is identified. Typically, the resources contained in an optimal or near optimal grouping are all resources that are related or describe a similar topic.

In some implementations, the partitioning engine 112 can form a user-specified number of groups or clusters. For example, the number of clusters can be specified by the user. The number of clusters can influence the topics identified in each of the clusters. For example, if the user specifies a relatively small number of clusters, then a larger number of resources will be contained in each cluster and multiple or broader topics can be contained in a single cluster. If the user specifies a larger number of clusters, then fewer resources will be contained in a single cluster and each cluster can represent a single or more narrow topic. Further, partitioning engine 112 may be provided to analyze the resources contained in each cluster to apply a label/descriptor to each cluster. The label/descriptor can be any type of token, word, phrase, sentence, or a combination of topic features. In some implementations, the label can be chosen to identify the topic(s) contained in the cluster or can be an arbitrary string in accordance to a naming convention specified by the user of the customer-support module 108. In some implementations, multiple clusters can be related to the same topic or similar topics.

Further, the customer-support module 108 includes an association engine 114 to produce and store associations between phrases/terms included in customer feedback with phrases/terms included in the support content. For example, the association engine 114 can use the grouped or clustered documents from partitioning engine 112 to create associations between customer feedback and support content. As shown, the associations 116 may be used by the partitioning engine 112 and/or the solution engine 120.

The association engine 114 can use partitioning and/or clustering techniques to build groups representing associations among related customer feedback and support content. For example, the association engine 114 can store the clusters and any other information (e.g., including information identifying the solutions that correspond to the customer feedback) in the associations 116. Conventional partitioning and/or clustering techniques can be used to group the customer feedback and the support content. In some implementations, the partitioning and/or clustering techniques can utilize a high-quality text clustering algorithm, such as the distributed exchange algorithm, in which the clustering can produce an arrangement of customer feedback and support content that have the maximum number of keywords in common therebetween and within the cluster, and therefore a high probability of describing the same specific topic.

In some implementations, associations 116 among related customer feedback and support content can occur, for example, because proposed solutions for the customer feedback are often embedded in the e-mail threads as predetermined canned responses, e.g., as links to help center articles, help forum posts, etc. In some implementations, multiple solutions for a given problem included in one or more documents 110 can be clustered together as a result of clustering the customer feedback and support content together. In some implementations, the association engine 114 can be used to associate one-to-many links from a customer feedback to possible solutions. This can facilitate the selection of a best solution among a variety of possible solutions, by a solution engine 120, for a given issue.

When used by the partitioning engine 112, existing or additional associations 116 from association engine 114 can be used to further partition new documents provided to customer-support module 108. In one example, partitioning engine 112 generates a report based on clusters formed by partitioning engine 112, as described in further detail below. Further, in the exemplary customer-support module 108, a solution engine 120 can also be included to automatically identify one or more support solutions 122 for a new user customer feedback and/or document 110 that is processed by the customer-support module 108.

In some implementations, the customer-support module 108 includes a filtering engine 118 to filter customer feedback and/or support content from documents 110. More specifically, the filtering engine 118 is configured to process a document from the documents 110 to extract the customer feedback from the document, leaving only the support content, or vice-versa. In one example, because individual users provide customer feedback at user devices 102, the customer feedback 103 may be phrased several different ways to describe the same issue, problem, comment, or question. By filtering out customer feedback 103, for example, the remaining document includes only the support content 107 provided in response to the customer's issue, problem, comment, or question. As such, "noise" (i.e., referring to an issue or similar issues through various different, often unofficial, terms/phrases by multiple different users) within the cluster of documents 110 may be reduced, as compared to processing documents with customer feedback and support content therein. Alternatively, documents may be filtered, at the filtering engine 118, to retain customer feedback while filtering out the support content for further processing as described herein. In either implementation, the plurality of filtered documents may be stored in the database of documents 110 for further processing, as described herein.

In some implementations, the support content 107 can include predetermined responses (e.g., organized by product and issue) that represent a library or repository of most frequently-presented solutions to customer problems presented in the customer feedback. For example, one or more predetermined responses can exist for login/password issues related to a particular online advertising system. In some implementations, one or more support solutions can include a predetermined response to a customer, describing a step-by-step solution to a specific customer problem. For example, the standard message for password/login problems can include multiple steps or points to consider in order to reset or retrieve a login or password. The predetermined responses can have the common text, such as an email form, that includes text and/or other content that is common to all instances of the particular problem. The predetermined response can also include placeholders for particular fields and information in the form that can then be filled in as part of the response, e.g., based on attributes of the specific customer and the particular problem. For example, the placeholders can be used to fill in the user's name, particular information for the current instance of the password/login problem, identification of a product, and so on.

At some later time, such as after the customer-support module 108 is populated with filtered and/or unfiltered doucments 110, a user device 102 can generate new customer feedback, and new support content responsive thereto, which provides a new document. In some implementations, the support systems 106 can automatically access the customer-support module 108 to attempt to identify a possible support solution 122 that corresponds to the new document (including customer feedback and/or support content). In some implementations, the solution engine 120 can access the associations 116 and provide one or more automatically-generated support solutions 122 to the user device 102. In some implementations, each support system 106 can host its own customer-support module 108. For example, the customer feedback and support content can be local to the support system 106, which can update each with the customer feedback that is received and the support content that is generated in response. Moreover, the solution engine 120, which can also be local to the support system 106, can be invoked for each customer feedback received in order to automatically generate recommended solutions based on associations between past user feedback items and resulting support solutions.

Figure 2:
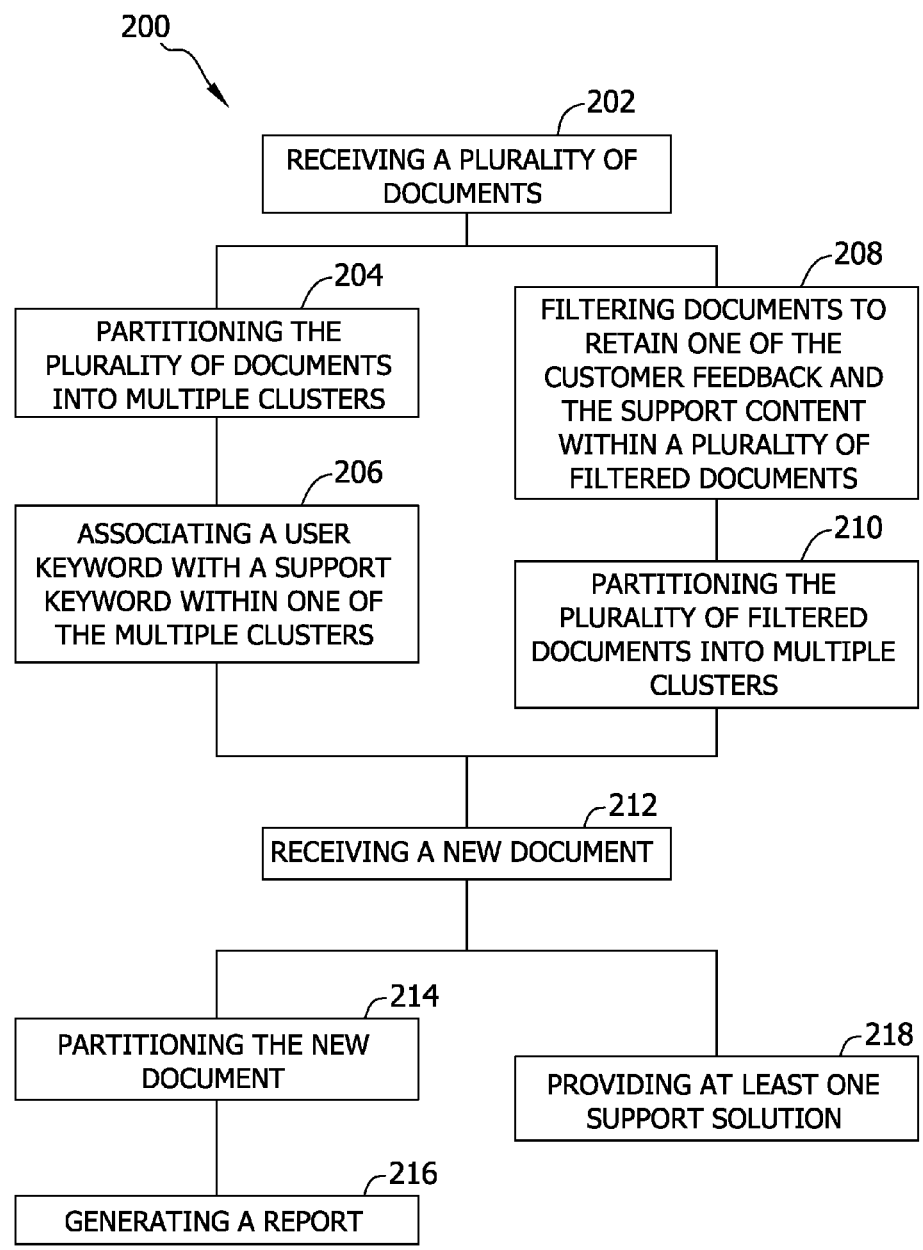
FIG. 2 is a flow chart of an exemplary method for use in processing a corpus of documents.

FIG. 2 is a flow chart of an exemplary method 200 for partitioning documents including customer feedback and support content. The method 200 includes multiple processes that can be implemented as instructions and executed by one or more processors in one or more computer systems. In some implementations, method 200 can be performed by the customer-support module 108, including the association engine 114, partitioning engine 112, the filtering engine 118, and the solution engine 120 included therein and illustrated in the exemplary environment of FIG. 1.

The method 200 includes receiving 202 a plurality of documents. This can occur continuously over time, e.g., as each user submits customer feedback for a particular issue, such as a problem, question or comment. The documents are initially provided based on a user submitting customer feedback through user device 102. As a CSR and/or an automated system communicate with user device 102, a document is created, which includes the customer feedback and support content. More specifically, the support system 106 can receive the customer feedback and generate support content, which is included with the customer feedback. In one example, each email, chat, or help forum thread between the user and the CSR constitutes a document, which may be received 202 by the customer-support module 108, and/or a database storing documents 110 included therein. Over time, customer-support module 108 may receive many (e.g., hundreds, thousands, or more) documents reflecting issues, such as problems, questions, and/or comments. It should be appreciated that the documents 110 may or may not include a support solution, because the document may be received 202 by customer-support module 108, prior to resolving the issue indicated in the customer feedback. In other examples, the customer-support module 108 may be limited to receiving 202 documents containing a complete conversation and/or thread between the user and the CSR.

Using one or more partitioning and/or clustering techniques, partitioning engine 112 partitions 204 the plurality of documents 110 into groups, such as, for example, clusters grouped by topic. Once the documents 110 are partitioned into multiple clusters, the partitioned documents can be provided to the association engine 114. In turn, the associating engine 114 is provided to associate 206 at least one user keyword with at least one support keyword within one of the multiple clusters. In one example, documents are partitioned together such that each document related to a specific topic, such as an issue (e.g., problems, questions, comments, etc.). Accordingly, user keywords from the users (i.e., customer feedback) and support keywords from the CSR (i.e., support content) can be generally understood to be related to the same topic. As such, the user and support keywords may be associated 206, such that either of the user keywords or the support keywords can be indicative of the topic (e.g., an issue) common to each of the documents within the cluster. The associations 116 can be one-to-one, or include one support keyword to many user keywords, or vice-versa. The associations 116 may be evaluated, for example, by a purity score associated with the cluster (e.g., number of documents with the user/support keywords to the total number of documents in the cluster), indicating a likelihood that the user keywords and support keywords are related to the topic of the cluster. In at least one implementation, manual quality control can be used to evaluate associations 116 between user keywords and support keywords. In some implementations, the associations 116 are stored as the customer-support module 108.

In some implementations, associating keywords (e.g., phrases or terms) can include applying a term frequency analysis to the customer feedback and the support content to develop a mapping between keywords of the customer feedback with keywords of the support content. Further, such user and support keywords can be further mapped to one or more support solutions. For example, for a group of documents 110 having customer feedback that include issues such as "cannot login" and "lost password" or support content that includes phrases such as "password incorrect," there can be one or more support solutions that solve those issues. Example support solutions can include inquiring whether "Caps Lock" is on, providing steps for re-setting a password, providing password hints, and so on. In another example, a document about a customer experiencing a login issue may include the phrase "can't get in" from the customer and "login failure" in the support content, and/or a support solution, such as "reset password" in the support content. Moreover, example results of the associating engine 114 can include combining user issues such as "cannot login," "lost password," and others into one or more other clusters because the problems and/or the corresponding solutions are related. For example, user feedback issues related to "cannot login," "lost password" and "password expired" can be included in a cluster corresponding to "cannot login," "lost password," or "login issues."

As shown in FIG. 2, instead of associating 206 keywords between the customer feedback and the support content, filtering engine 118 may be used. More specifically, method 200 alternately includes filtering 208 the documents 110 to retain one of the customer feedback and the support content within a plurality of filtered documents. In one example, email threads include alternating customer feedback and support content, which proceeds until a resolution of the issue is reached. In such an example, filtering engine 118 is configured to identify support content based on username and/or email address (e.g., @ABC.com) from a CSR for ABC Company and filter the customer feedback from the document. In this manner, the remaining document may retain a more precise and/or consistent description of the issue indicated in the initial customer feedback of the document. The customer feedback and the support content can be stored separately by filtering engine 118 in various implementations, such as, for example, in the database of documents 110. In other implementations, one of the customer feedback and the support content may be stored for further use in partitioning documents and/or identifying support solutions, while the other of the customer feedback and the support content is discarded.

After filtering 208 the plurality of documents, partitioning engine 112 is configured to partition 210 the plurality of filtered documents 110 into multiple clusters. Because the filtered documents include a more precise description of the issue, the resulting clusters from partitioning 210 are more precise and consistent with the topic of the cluster. More generally, in such implementations, because the unofficial language contained in the customer feedback is filtered from the documents, support content, which generally includes consistent official language, forms the basis for the partitioning by partitioning engine 112. Accordingly, the documents related to the same topic are more likely to be partitioned together, without having to account for noise injected by various differing tones, terms, and phrases of the different users. For example, the filtered documents can enhance the accuracy of partitioning documents, potentially due to a reduction in noise by filtering out customer feedback. While the examples provide herein include filtering the customer feedback from the documents, it should be appreciated that in various implementations, support content can be filtered from the documents 110 to retain the customer feedback and provide, for example, a more concise clustering of user tones, terms, and phrases, etc. Such filtered document may be usable, for example, in automatically providing support solution, in response to customer feedback, prior to one or more CSR responses to the customer feedback.

In some implementations, one or more new documents are received into the documents 110 over time, to be used in combination with clusters formed from filtered documents and/or keywords included in the associations 116 from the association engine 114. As shown in FIG. 2, method 200 proceeds to receive 212 a new document. The new document may contain customer feedback, alone or in combination with support content. As should be appreciated, in various implementations, the new document can be processed and/or partitioned with multiple other documents 110 according to the method steps provided above. Alternately, the new document can be processed and/or partitioned based on the associations 116 and/or keywords identified from partitioning 210 the filtered documents into multiple clusters. In some implementations, the method 200 can include partitioning 214 the one or more new documents, into existing clusters of documents 110 or in combination with other previously received, filtered or unfiltered, documents 110. In one example, the new document may be partitioned 214 by appending the new document to a cluster based on a user keyword and/or a support keyword (identified as described above at step 206) contained within the new document. Partitioning 214 the new documents, alone or in combination with previous documents, into clusters can provide various different types of information, indicated by the topics, the purity metric, and/or other metric of the clusters and the document contained therein. The clusters may indicate the prevalence of a particular issue, or the frequency with which particular support content is offered to the user, with or without success. The information can be extracted from the cluster through one or more report.

In some implementations, partitioning engine 112 generates 216 a report indicative of the clusters partitioned thereby. The report can be generated, for example, based on the clusters, the relative importance of each of the clusters/topics, and the content included therein. For example, the partitioning engine 112 can generate a report including each topic, an average number of page views associated with each topic, one or more purity, relevance, and/or sentiment metric associated with each cluster/topic. In some implementations, the report can be used to identify one or more topics to be addressed for one or more products or services. In some implementations, the report is displayed at support system 106 or an administrative computing device including and/or associated with customer-support module 108.

Additionally, or alternatively, in some implementations, at least one support solution 122 that corresponds to the new customer feedback is automatically provided 218. In at least some implementations, the support solution can be provided by the solution engine 120 using the association 116 from association engine 114. In one example, using a description such as "cannot login" for customer feedback, the solution engine 120 can look up association 116 containing the same phrase, and retrieve support content and/or keywords associated therewith. The support content and/or keywords can include, for example, inquiries posed by a prior CSR, phrases entered by the CSR, predetermined responses, and/or one or more support solutions associated with the keywords provided in the customer feedback. The solution engine 120 can then offer the support solution, or proceed with questions or other content included in the support content, to the user in response to the customer feedback.

In some implementations, the solution engine 120 provides 218 multiple proposed support solutions 122. The support solutions can be ranked by their confidence scores, and the proposed support solutions having the highest-ranked confidence scores can be selected. For example, a confidence score of 89 can represent an 89% chance that the proposed support solution will succeed in correcting the issue indicated in the customer feedback. As an example, if ten proposed support solutions are provided, the solution engine 120 can assign confidence scores to each of the ten proposed support solutions that are based, for example, on the number of times that each of the proposed support solutions was used previously to solve issues identical or similar to that indicated in the customer feedback. In some implementations, the solution engine 120 can select the highest-ranked support solutions that were used at least a threshold number of times (e.g., at least a hundred). As a result, less then all (e.g., five or six) of the ten possible support solutions can be selected.

In some implementations, a confidence score of a proposed solution can be based on the confidence of the classification of the customer feedback. In implementations using unsupervised partitioning, the confidence scores can correspond to purity scores of the group or cluster. In implementations using classification-based partitioning, the confidence scores can correspond to a numeric classification confidence value provided by a classifier (e.g., using keywords and/or associations 116 identified as described herein). In some implementations, confidence scores can be provided to CSRs who use information to help in selecting from proposed support solutions in order to identify support solutions to provide to the user. In some implementations, confidence scores can be provided with the support solutions that are presented to the user. For example, standard predetermined responses can include "We think your problem will be solved by X (90% chance), but if not try Y and Z".

The at least one support solution is provided, by the solution engine 120, to the support system 106 and/or the user device 102. In some implementations, when a high confidence score exists that one or more particular support solutions are applicable to a particular issue indicated in the customer feedback, the solution engine 120 can provide the support solution directly to the user device 102. In some implementations, the solution engine 120 can provide the support solution to the support system 106 which can forward the support solutions to the user device 102. In some implementations, a support user (e.g., a CSR) can review the one or more recommended support solutions provided by the solution engine 120 and select one or more of the support solutions (and/or provide some other support solutions not recommended) to forward to the user device 102.

Figure 3:
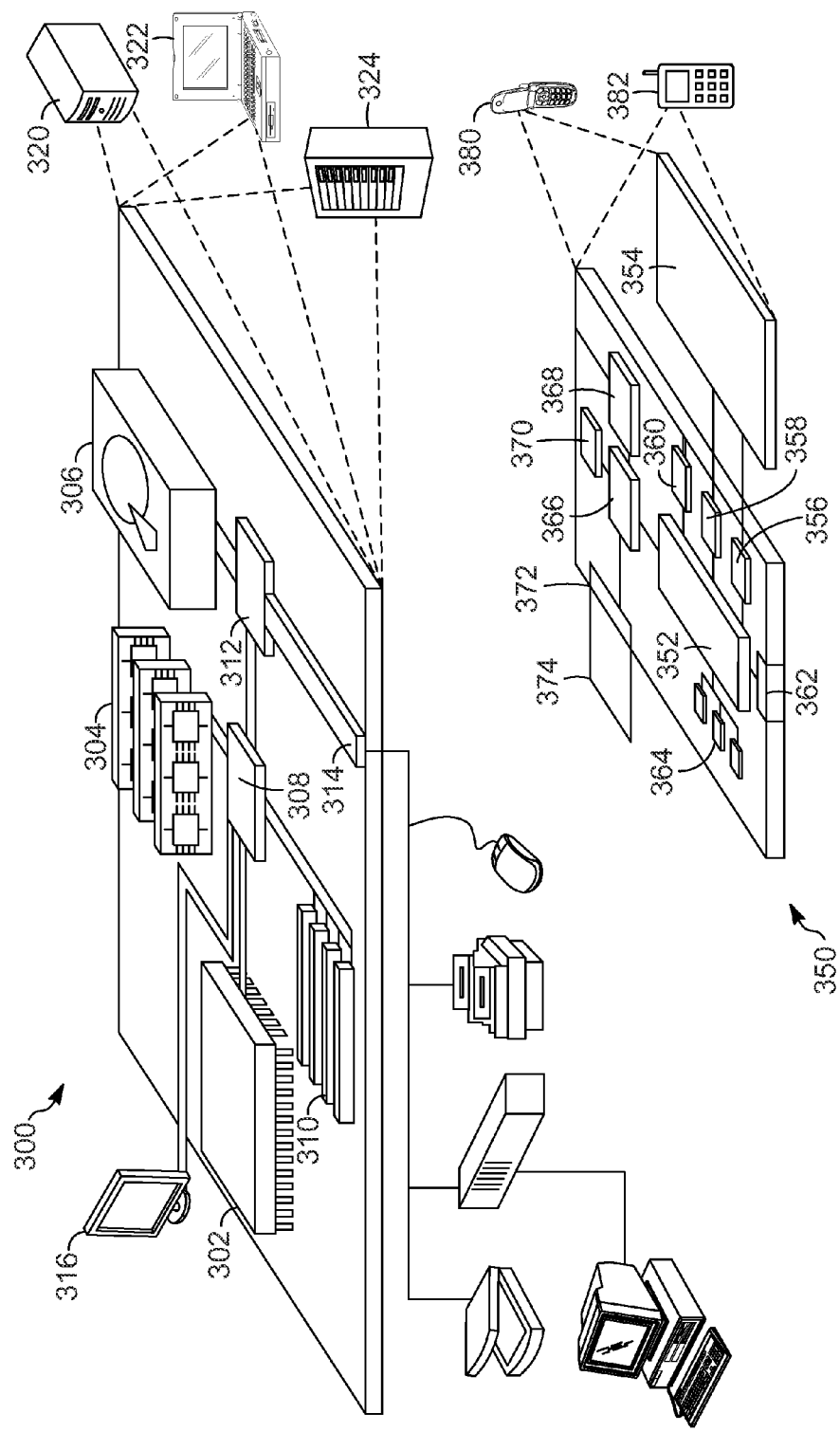
FIG. 3 is a block diagram of example computing devices that may be used to implement the systems and methods described herein.

FIG. 3 is a block diagram showing example or representative computing devices and associated elements that may be used to implement the environment of FIG. 1. FIG. 3 shows an example of a generic computing device 300 and a generic mobile computing device 350, which may be used with the techniques described here. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface or controller 308 connected to memory 304 and high-speed expansion ports 310, and a low-speed interface or controller 312 connected to low-speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high-speed controller 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed bus 314. The low-speed bus, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in FIG. 3. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a micro drive or other device, to provide additional storage. Each of the components 350, 352, 364, 354, 356, and 358, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Device 350 may communicate wirelessly through communication interface 356, which may include digital signal processing circuitry where necessary. Communication interface 356 may provide for communication under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 358. In addition, short-range communication may occur, such as using a Bluetooth, WiFi, or other such transceiver (not shown). In addition, GPS (Global Positioning system) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in FIG. 3. For example, it may be implemented as a cellular telephone 380. It may also be implemented as part of a smart phone 382, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 300 and/or 350) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 300 and 350 are configured to receive and/or retrieve electronic documents from various other computing devices connected to computing devices 300 and 350 through a communication network, and store these electronic documents within at least one of memory 304, storage device 306, and memory 364. Computing devices 300 and 350 are further configured to manage and organize these electronic documents within at least one of memory 304, storage device 306, and memory 364 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer-readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method including executing instructions stored on a non-transitory computer-readable storage medium, said method comprising:
   receiving a plurality of documents from a plurality of different communication channels, at least a portion of the plurality of documents including a set of content representing an interaction between a user and a support entity, wherein the set of content includes both customer feedback content received from a user, and support content provided by the support entity and to the user responsive to the customer feedback content;
   identifying, within each document of the portion of the received plurality of documents, the customer feedback content received from a user and the support content provided to the user responsive to the customer feedback;
   filtering, by a processor executing the instructions, the portion of the received plurality of documents, including removing the customer feedback content and retaining the support content;
   partitioning, after the filtering, the plurality of filtered documents, in which the customer feedback has been removed, into multiple clusters based on the support content of each of the plurality of filtered documents;
   after the partitioning, for each filtered document in each cluster of the multiple clusters, associating the customer feedback content that was filtered from the filtered document with the cluster to which the filtered document belongs and the retained support content from that filtered document, and storing association information in memory;
   receiving a new document including customer feedback related to an issue;
   determining, using the association information in the memory, that the customer feedback of the new document matches the customer feedback content associated with one of the clusters; and
   providing, over a communication connection with a user associated with the new document, the retained support content associated with the cluster based on the match between the customer feedback of the new document and the customer feedback content that was associated with the cluster after the partitioning.

2. The method of claim 1, wherein the support content of at least one of the filtered documents comprises a term descriptive of a product or a service.

3. The method of claim 1, wherein partitioning the plurality of filtered documents into multiple clusters comprises categorizing the support content of each of the plurality of filtered documents according to a topic associated with said one of the multiple clusters.

4. The method of claim 1, wherein the plurality of different communication channels includes at least one of an email thread, a chat thread, and a help forum thread between a user and a customer service representative.

5. The method of claim 1, wherein the support content includes at least one support solution, and wherein partitioning the plurality of filtered documents includes partitioning the plurality of filtered documents based on the at least one support solution.

6. The method of claim 1, further comprising generating a report indicating at least one topic associated with said one of the multiple clusters.

7. The method of claim 5, where the at least one support solution comprises predetermined response.

8. The method of claim 1, wherein receiving the plurality of documents includes retrieving the plurality of documents from a database configured to store the plurality of documents.

9. A computer system for use in partitioning a plurality of documents, said computer system comprising:
   a plurality of processing engines; and
   a non-transitory memory device accessible by said processing engines, said memory device for storing a plurality of documents, at least a portion of the plurality of documents including customer feedback content and support content responsive to the customer feedback content,
   wherein said plurality of processing engines are configured to perform the operations of:
   receiving a plurality of documents from a plurality of different communication channels, at least a portion of the plurality of documents including a set of content representing an interaction between a user and a support entity, wherein the set of content includes both customer feedback content received from a user, and support content provided by the support entity and to the user responsive to the customer feedback content;
   identifying, within each document of the portion of the received plurality of documents, the customer feedback content received from a user and the support content provided to the user responsive to the customer feedback;
   filtering, by a processor executing the instructions, the portion of the received plurality of documents, including removing the customer feedback content and retaining the support content;
   partitioning, after the filtering, the plurality of filtered documents, in which the customer feedback has been removed, into multiple clusters based on the support content of each of the plurality of filtered documents;
   after the partitioning, for each filtered document in each cluster of the multiple clusters, associating the customer feedback content that was filtered from the filtered document with the cluster to which the filtered document belongs and the retained support content from that filtered document, and storing association information in memory;

receiving a new document including customer feedback related to an issue;

determining, using the association information in the memory, that the customer feedback of the new document matches the customer feedback content associated with one of the clusters; and providing, over a communication connection with a user associated with the new document, the retained support content associated with the cluster based on the match between the customer feedback of the new document and the customer feedback content that was associated with the cluster after the partitioning.

10. The system of claim 9, wherein partitioning the plurality of filtered documents into multiple clusters comprises categorizing the support content of each of the plurality of filtered documents according to a topic associated with said one of the multiple clusters.

11. The system of claim 9, wherein the support content includes at least one support solution, and wherein partitioning the plurality of filtered documents includes partitioning the plurality of filtered documents based on the at least one support solution.

12. The system of claim 9, wherein the plurality of documents comprises at least one of an email thread, a chat thread, and a help forum thread between a user and a customer service representative.

13. A non-transitory computer-readable storage device having encoded thereon computer readable instructions, which when executed by a processor, cause the processor to:

retrieve a plurality of documents from a database, at least a portion of the plurality of documents including a set of content representing an interaction between a user and a support entity, wherein the set of content includes both customer feedback content received from a user, and support content provided by the support entity and to the user responsive to the customer feedback content;

identify, within each document of the portion of the received plurality of documents, the customer feedback content received from a user and the support content provided to the user responsive to the customer feedback;

filter the portion of the plurality of documents, including removing the customer feedback content and retaining the support content;

partition, after the filtering, the plurality of filtered documents, in which the customer feedback has been removed, into multiple clusters based on the support content of each of the plurality of filtered documents;

after the partitioning, for each filtered document in each cluster of the multiple clusters, associate the customer feedback content that was filtered from the filtered document with the cluster to which the filtered document belongs and the retained support content from that filtered document, and storing association information in memory;

receive a new document including customer feedback related to an issue;

determine, using the association information the in memory, that the customer feedback of the new document matches the customer feedback content associated with one of the clusters; and provide, over a communication connection with a user associated with the new document, the retained support content associated with the cluster based on the match between the customer feedback of the new document and the customer feedback content that was associated with the cluster after the partitioning.

14. The computer-readable storage device of claim 13, wherein the support content of at least one of the filtered documents comprises a term descriptive of a product or a service.

15. The computer-readable storage device of claim 13, wherein partitioning the plurality of filtered documents into multiple clusters comprises categorizing the support content of each of the plurality of filtered documents according to a topic associated with said one of the multiple clusters.

16. The computer-readable storage device of claim 13, wherein the plurality of different communication channels includes at least one of an email thread, a chat thread, and a help forum thread between a user and a customer service representative.

17. The computer-readable storage device of claim 13, wherein the support content includes at least one support solution, and wherein partitioning the plurality of filtered documents includes partitioning the plurality of filtered documents based on the at least one support solution.

18. The computer-readable storage device of claim 13, further comprising generating a report indicating at least one topic associated with said one of the multiple clusters.

* * * * *